United States Patent [19]

Klein

[11] Patent Number: 4,590,700

[45] Date of Patent: May 27, 1986

[54] SAFETY FISH LANDING HOOK

[76] Inventor: Gerald B. Klein, 13451 Stuart Ct. (Rt. 2, Box 713), Broomfield, Colo. 80020

[21] Appl. No.: 631,442

[22] Filed: Jul. 16, 1984

[51] Int. Cl.$^4$ .......................................... A01K 97/14
[52] U.S. Cl. ........................................................ 43/5
[58] Field of Search ................. 43/5, 6; 294/26, 19.3

[56] References Cited

U.S. PATENT DOCUMENTS

| | | | |
|---|---|---|---|
| 1,596,631 | 8/1926 | Seibold | 294/26 |
| 2,112,765 | 3/1938 | Darling | 294/26 |
| 2,214,660 | 9/1940 | Darling | 294/26 |
| 2,463,706 | 3/1949 | Martineau | 294/26 |
| 2,516,620 | 7/1950 | Darling | 294/26 |
| 2,725,253 | 11/1955 | Wallman | 294/26 |

Primary Examiner—Gene P. Crosby
Attorney, Agent, or Firm—Dennis O. Kraft

[57] ABSTRACT

A safety landing hook for landing fish is disclosed, the hook has an elongate member having a handle at one end and a comparatively large hook at the opposite end. A hinge permits the hook to swing from an extended position towards the handle and to a retracted position where the point of the hook contacts the handle. A lock normally locks the hinge with the hook at its extended position but can release the hinge to permit the hook to swing to its retracted position, and a holding arrangement holds the point of the hook in its retracted position when the landing hook is not being used.

10 Claims, 8 Drawing Figures

U.S. Patent  May 27, 1986  4,590,700
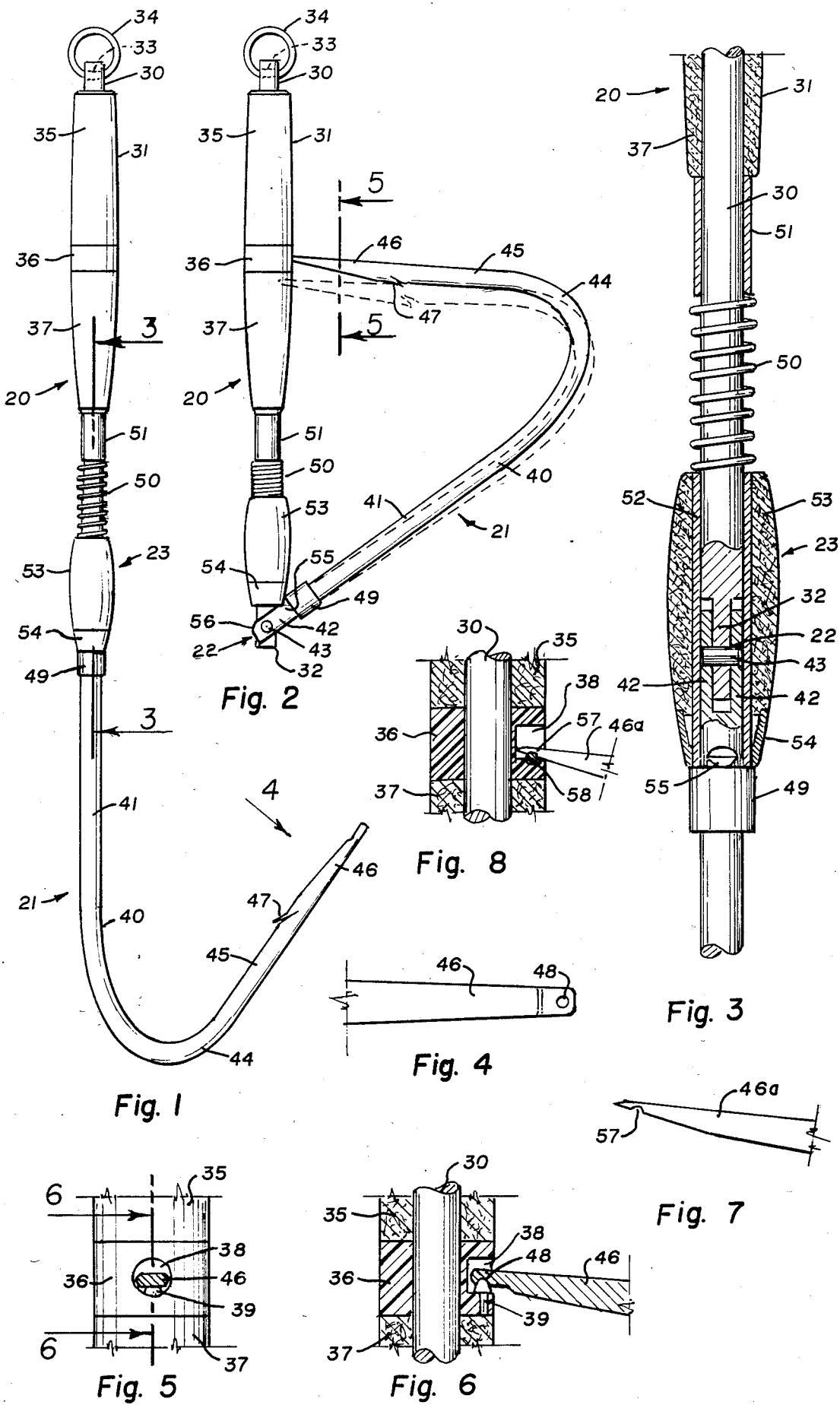

SAFETY FISH LANDING HOOK

The present invention relates to fish landing devices and more particularly to fish landing devices which use a hook to seize, hold and land a fish. Such fish landing devices include gill hooks and gaffs and will hereinafter be referred to as a "landing hook."

More specifically, the present invention is a safety landing hook especially suited for sports fishermen who are afoot or are in a small boat and who catch fish too large to be easily landed with a net. As such, the safety landing hook must be small enough to permit a fisherman to hold it with one hand while he holds the rod and plays the fish with the other hand, in the same manner as if he were using a landing net. The safety landing hook is formed as a shaft-like member, 2 to 3 feet long with a handle at one end of the shaft and a comparatively large hook at the other end. To seize a fish, the hook is placed behind the gill cover and as the fish opens this cover the spur of the hook is threaded under the gill cover. For this purpose, the hook does not need any sharp edges nor a sharp point to hold a fish and it will not necessarily injure a fish when it is being landed.

It is to be noted, however, that the same structure as herein described may be modified by providing a sharp point to become a gaff with which a fish will be seized by impaling it upon the hook. Accordingly, the present invention may also be a gaff.

A sports fisherman afoot or in a small boat must carry his gear with him and a landing hook is awkward and even dangerous to carry, especially when it is not in use. It is too long to be conveniently carried at a fisherman's waist, as attached to his belt, and too awkward to be carried over his shoulder. The open hook, even a dull pointed gill hook, can be dangerous since it can snag clothing, tangle gear and even stab a fisherman should he stumble and fall. It follows that landing hooks are not used as extensively as they could be used even though there is a need for such landing hooks where the sportsmen catch fish too large to be easily landed with a landing net.

The present invention was conceived and developed with the foregoing and other considerations in view, and the invention comprises, in essence, a fish landing hook formed as an elongate member with a handle at one end and a hook at the other end. A safety feature, a hinge, is disposed between the handle and the hook with the hinge axis normal to the plane of the hook to permit the hook to swing from an extended position to a folded position when not in use. The landing hook, as the invention will be hereinafter called, is normally held in a straight, extended position by a lock sleeve over the hinge which may be shifted away from the hinge to permit the hook to swing towards the handle to its folded position with the point of the hook being securely and safely fitted into a socket in the side of the handle. As a further feature, when in use, the folded hook may be quickly extended by a simple one-handed wrist snap, as will be described.

It follows that the objects of the present invention are to provide a novel and improved fish landing hook which: (a) is ideally proportioned for use by a sports fisherman in lieu of a net where large fish are being caught; (b) is made of lightweight, water-resistant materials to render it easy to carry and easy to use; (c) can be folded into a comparatively compact unit for carrying but can be quickly and easily extended for use when needed even as a one-handed operation as when a fisherman is about to land a large fish; (d) when at the folded position can be carried by a fisherman while he is fishing without any danger of the hook snagging clothing and gear or stabbing the fisherman; and, (e) is a simple, neat-appearing, economical, rugged and durable unit.

With the foregoing and other objects in view, all of which more fully hereinafter appear, my invention comprises certain constructions, combinations and arrangements of parts and elements as hereinafter described, defined in the appended claims and illustrated in preferred embodiment in the accompanying drawings in which:

FIG. 1 is an elevational view of my improved landing hook with the hook extended as when it is being used.

FIG. 2 is an elevational view of the hook shown at FIG. 1, but with the hook being folded and retracted with the point in a socket in the handle and with dotted lines illustrating how the hook is flexed to more securely hold the point in the handle socket.

FIG. 3 is a fragmentary sectional view as taken from the indicated line 3—3 at FIG. 1 but on an enlarged scale.

FIG. 4 is a fragmentary view as taken from the indicated arrow 4 at FIG. 1 but on an enlarged scale.

FIG. 5 is a fragmentary sectional view as taken from the indicated line 5—5 at FIG. 2 but on an enlarged scale.

FIG. 6 is a fragmentary sectional view as taken from the indicated line 6—6 at FIG. 5.

FIG. 7 is a fragmentary view of the end of a hook similar to the hook shown at FIG. 5 but showing a modified sharp pointed tip as would be used if the landing hook were a gaff.

FIG. 8 is a fragmentary sectional view, similar to FIG. 6 but showing a modified retaining means to hold the end of the hook which has a simple notch near its point.

Referring more particularly to the drawing, the improved landing hook consists of a handle section 20 and a hook section 21 which are joined together by a hinge 22. A lock sleeve 23 on the handle section is adapted to slide over the hinge 22 to hold the two sections in an extended alignment or to slide from the hinge 22 to permit the two sections to be folded together.

The handle section 20 is a rod 30 with a handle grip 31 being mounted near the extended end of the rod, opposite to the hinge 22, and with a free section being provided adjacent to the hinge end whereon the lock sleeve is mounted. The rod 30, is of lightweight material such as a high strength aluminum. It is circular in cross section, is of any suitable length, preferably 12 to 18 inches, and may be approximately ⅜-inch in diameter to match the diameter of a rod forming the hook section hereinafter described. A handle grip 31 is provided near the outward end of the rod. A finger 32 at the hinge end of the rod meshes between fingers at the end of the hook section rod to form the hinge 22 as hereinafter described. The opposite extended end of the rod is provided with a hole 33 wherethrough a ring 34 or swivel is provided for attachment to a lanyard or the like, as shown, or to permit the landing hook to be hung upon a fastener.

The handle grip 31 is a 3-piece, tubular member having a length suitable for easy gripping. It consists of an outer body member 35, a short central bushing 36 and an inward body member 37. The passageway through the members is sized to fit snugly upon the rod 30 and these members may be affixed to the rod 30 as by an adhesive. The outer diameter of these members is on the order of 1-inch and the members are slightly tapered to a maximum diameter at the central bushing, all in a conventional handle-form. The body members 35 and 37 are preferably of a material such as cork, suitable for secure gripping even when the handle is wet. The bushing 36 may be of a plastic material to provide for a socket 38 in the side thereof for receiving the point of the hook. A pin 39, FIG. 5, is embedded in the bushing 36, in spaced parallelism with the rod 30, with a spherical head projecting into the socket 38 to engage the hook as will be further described.

The hook section 21 is formed by a hook rod 40 which is similar to the handle rod 30 but is bent to a hook shape. As such, the hook section includes a straight shank 41 connecting with the handle section, with fingers 42 at the end of the shank embracing the finger 32 of hinge 22. A pivot pin 43 interconnects these fingers 32 and 42. Beyond the shank, the hook section turns as a base curve 44 through an arc of approximately 225 degrees and extends from this base curve 44 as a spur 45 which terminates as a tapered, flattened, dull point 46. A barb 47 may be provided at the base of the point 46. This hook rod 40 is a lightweight material such as high strength aluminum. It is preferably circular in cross section and of the same diameter as the handle rod 30.

The length of the hook section 21 is such that it matches the length of the handle section 20 in a manner that permits the hook point 46 to be moved into the bushing socket 38 when the hook section 21 is folded against the handle section 20. Actually, the hook section 21 is bent and proportioned such that in folding, the point strikes the side of the handle grip 31 about ¾-inch short of or below the socket 38, as to the position indicated in broken lines at FIG. 2. Thus, the hook section 21 must be flexed to reach the socket 38. The inner side of the flat point 46 has a spherical bottomed hole 48 near its end which will fit over spherical head of the pin 39 to lock the hook point within the socket 38 as best shown at FIG. 5. Accordingly, the flexing pressure by the hook section 21 will normally hold it in the socket 38 and prevent an accidental opening of the folded hook section to its extended position until the hook point is lifted off the pin 39. This is a simple yet important safety feature of the improved landing hook.

Whenever the landing hook is needed, as while fishing, it may be important that it be easily shifted from the folded position, FIG. 2, to the extended position, FIG. 1, as a quick, one-handed operation. While grasping the handle 31, a simple finger or thumb movement can release the hook point 46 from the socket 38 and a swinging movement will move the hook section 21 to its extended position. A more simple and preferred mode of release, facilitated by the spherical bottomed hole 48 nesting upon the spherical head of the pin 39, is to simply give the folded hook a wrist snap with a moderate degree of force, such that the inertia of the hook causes the end of the hook to slip off the pin 39 and rotate to a straight, extended alignment. The lock sleeve 23, actuated by a spring, then moves over the hinge 22 to secure the two sections in their extended alignment, all as further described.

When the hook is extended, the fingers 32 and 42 come into axial alignment so that the handle rod 30 and the shank 41 of the hook rod 40 form a continuous cylindrical member. The lock sleeve 23, a short tubular member slidably fitted on the handle section rod 30 can then move over the hinge 22 to lock the sections together. A collar 49 on the hook rod shank 41 adjacent to the fingers 42 serves as an abutment to limit the movement of the lock sleeve 23. A spring 50 and a spacer tube 51 are mounted upon the handle rod 30 between the lock sleeve 23 and the handle grip 31. The spring resiliently biases the lock sleeve 23 towards its locking position, the spring 50 and spacer tube 51 being proportioned to permit the lock sleeve 23 to be pulled towards the handle grip and away from the hinge 22 whenever the hook section is to be retracted as at FIG. 2.

The lock sleeve 23 may be formed as a tubular liner 52 which is encased within a handle-grip sleeve 53 of cork or a similar suitable material easy to grip even when it is wet. A ferrule 54 at the base of this lock sleeve 23 is provided to protect the handle grip 53. A notch 55 in the hook rod 40 adjacent to the abutment is provided for a flat abutment surface to engage the end of the ferrule. To provide a smooth surface against the abutment when the hook is being extended or retracted, the ends of the fingers 42 are rounded as at 56.

A fisherman afoot may carry the landing hook as by a thong or elastic cord connected to the ring 34 in the same manner as a landing net is carried. With the hook section 21 safely folded against the handle 31 and with the point of the hook secured on the pin 39 in the socket 38, the improved landing hook will cause no more carrying problems than would a regular landing net. The hazards encountered with a straight, open hook or a gaff are eliminated. When the landing hook is ready for use, the fisherman may simple grasp the handle, push the point 46 of the hook away from the pin 39, or simply snap the landing hook to its extended alignment, the inertial action of the hook being sufficient to release the hook from the pin 39. The spring-biased lock sleeve 23 will then shift to lock the landing hook in its extended position to be ready for use.

FIG. 7 shows the slight modification necessary to convert the landing hook into a gaff. It is merely necessary to provide a sharp point 46a on the spur 45 of the hook section. A barb 47, not shown, may be included in this arrangement. A transverse notch 57 at the underside of the point of the hook is provided to engage the pin 39 when the hook point 46a is retracted into the socket 38. Even though a landing hook is usually preferred by fishermen using this apparatus as described above, the safety feature of folding and securing the hook against the handle, if anything, is more important if the apparatus is a sharp pointed gaff.

The transverse notch 57 shown on the sharp pointed hook at FIG. 7 may also be used with the dull pointed hook of FIGS. 1-6 and in lieu of the pin 39 a cross bar 58 may be used in the socket 38 as shown at FIG. 8. The cross bar 58 is embedded in the bushing 36 to extend transversely across the socket.

I have now described my invention in considerable detail, however, it is apparent that others skilled in the art can devise and build alternate and equivalent constructions which are within the scope and spirit of my invention. Hence, I desire that my protection be limited, not by the constructions and details as described, but only by the proper scope of the appended claims.

I claim:

1. A landing hook for landing fish comprising:
   (a) an elongate member having a handle at one end and a comparatively large hook at the other end with the handle portion nearest adjacent to the hook and the hook shank adjacent to the handle being rod-like members of comparable size and form.

(b) a hinge formed as intermeshed fingers connecting the handle and hook having an axis normal to the plane of the hook to permit the hook to swing from an extended position, where the handle portion and hook shank form a continuous rod-like structure, to a retracted position where the point of the hook engages the side of the handle;

(c) a sleeve shiftable upon the handle to move over the hinge with the hook extended to lock the hook in the extended position;

(d) a spring means upon the handle urging the sleeve to the locking position;

(e) a socket in the side of the handle to receive the point of the hook but located a short distance from the position where the point of the hook engages the handle whereby the hook must be flexed and spread to move into the socket; and (f) an engaging means in the socket and a holding means at the point of the hook adapted to secure the point of the hook in the socket responsive to the flexing pressure produced by spreading the hook.

2. The landing hook defined in claim 1, wherein:

(a) the engaging means and holding means comprises a protrusion on one member and a depression in the other member, and (b) rounded surfaces on said members to permit separation of the members by a lateral force to permit the hook, when retracted, to release to move to the extended position as by a wrist snap or like sudden movement.

3. A landing hook for landing fish comprising:
an elongate member having a handle at one end and a comparatively large hook at the opposite end;
a hinge between the handle and the shank of the hook, with the hinge axis being normal to the plane of the hook to permit the hook to swing from an extended position towards the handle and to a retracted position where the point of the hook contacts the handle;
a lock means adapted to normally lock the hinge with the hook at its extended position but to release the hinge to permit the hook to swing to its retracted position, said lock means including a sleeve adapted to slidably fit over the hinge with one end of the sleeve embracing the handle and the other end of the sleeve embracing the shank of the hook when the sleeve locks the hook in its extended position; and
a holding means at the handle to engage and hold the point of the hook in its retracted position whenever the landing hook is not being used.

4. A landing hook for landing fish comprising:
an elongate member having a rod-like handle at one end and a comparatively large hook with a rod-like shank at the opposite end;
a hinge between the handle and the shank of the hook, with the hinge axis being normal to the plane of the hook to permit the hook to swing from an extended position towards the handle and to a retracted position where the point of the hook contacts the handle, said hinge comprising intermeshed finger extensions of the handle and shank rod-like members with the two members forming substantially a continuous rod-like structure when the hook is at its extended position;
a lock means adapted to normally lock the hinge with the hook at its extended position but to release the hinge to permit the hook to swing to its retracted position; the lock means comprises a tubular sleeve slidably embracing the hinge to slide over the hinge to lock it in its extended position but to slide from the hinge and upon one of the members to release the hinge and
a holding means at the handle to engage and hold the point of the hook in its retracted position whenever the landing hook is not being used.

5. The landing hook defined in claim 4 wherein:

(a) the sleeve is adapted to slide upon the handle away from the hinge and (b) a spring means on the handle resiliently urges the sleeve towards its locking position over the hinge.

6. The landing hook defined in claim 5, wherein a stop collar on the hook shank adjacent to the hinge limits the sleeve movement onto the hook shank to the locking position over the hinge.

7. The landing hook defined in claim 5, wherein the edges of the fingers on the hook shank are rounded to permit a smooth movement of the fingers abuting against the end of the sleeve as the hook is rotated as from a retracted position to an extended position.

8. A landing hook for landing fish comprising:
an elongate member having a handle at one end and a comparatively large hook at the opposite end;
a hinge between the handle and the shank of the hook, with the hinge axis being normal to the plane of the hook to permit the hook to swing from an extended position towards the handle and to a retracted position where the point of the hook contacts the handle;
a lock means adapted to normally lock the hinge with the hook at its extended position but to release the hinge to permit the hook to swing to its retracted position; and
holding means at the handle to engage and hold the point of the hook in its retracted position whenever the landing hook is not being used, said holding means comprising a socket in the side of the handle whereinto the point of the hook may move, a pin within the socket, and a hole near the point of the hook adapted to engage and seat upon the end of the pin.

9. A landing hook for landing fish comprising:
an elongate member having a handle at one end and a comparatively large hook at the opposite end;
a hinge between the handle and the shank of the hook, with the hinge axis being normal to the plane of the hook to permit the hook to swing from an extended position towards the handle and to a retracted position where the point of the hook contacts the handle;
a lock means adapted to normally lock the hinge with the hook at its extended position but to release the hinge to permit the hook to swing to its retracted position; and
holding means at the handle to engage and hold the point of the hook in its retracted position whenever the landing hook is not being used, said holding means comprising a socket in the side of the handle whereinto the point of the hook may move, a cross bar within the socket, and a notch near the point of the hook adapted to engage and seat upon the cross bar.

10. A landing hook for landing fish comprising:
an elongate member having a handle at one end and a comparatively large hook at the opposite end;
a hinge between the handle and the shank of the hook, with the hinge axis being normal to the plane of the hook to permit the hook to swing from an extended position towards the handle and to a retracted position where the point of the hook contacts the handle;
a lock means adapted to normally lock the hinge with the hook at its extended position but to release the hinge to permit the hook to swing to its retracted position; and
securing means at the handle to engage and hold the point of the hook in its retracted position whenever the landing hook is not being used;
wherein said securing means comprises a socket in the side of the handle whereinto the point of the hook may move upon flexing of the hook from a normal position as where the hook would touch the handle when retracted, a holding means within the socket, and an engaging means at the point of the hook adapted to be held by the holding means; and
wherein said holding means and said engaging means comprise a protrusion on one member and a depression in the other member positioned in the handle socket and on the hook point, said protrusion and said depression being maintained in engagement by pressure of one member against the other when the hook is flexed and retracted, said protrusion and said depression having rounded surfaces to permit separation therebetween and release of the hook from a retracted position to an extended position upon the application of a lateral force as by a sudden rotational movement of the landing hook effected by a wrist snap.

* * * * *